United States Patent Office 3,200,477
Patented Aug. 17, 1965

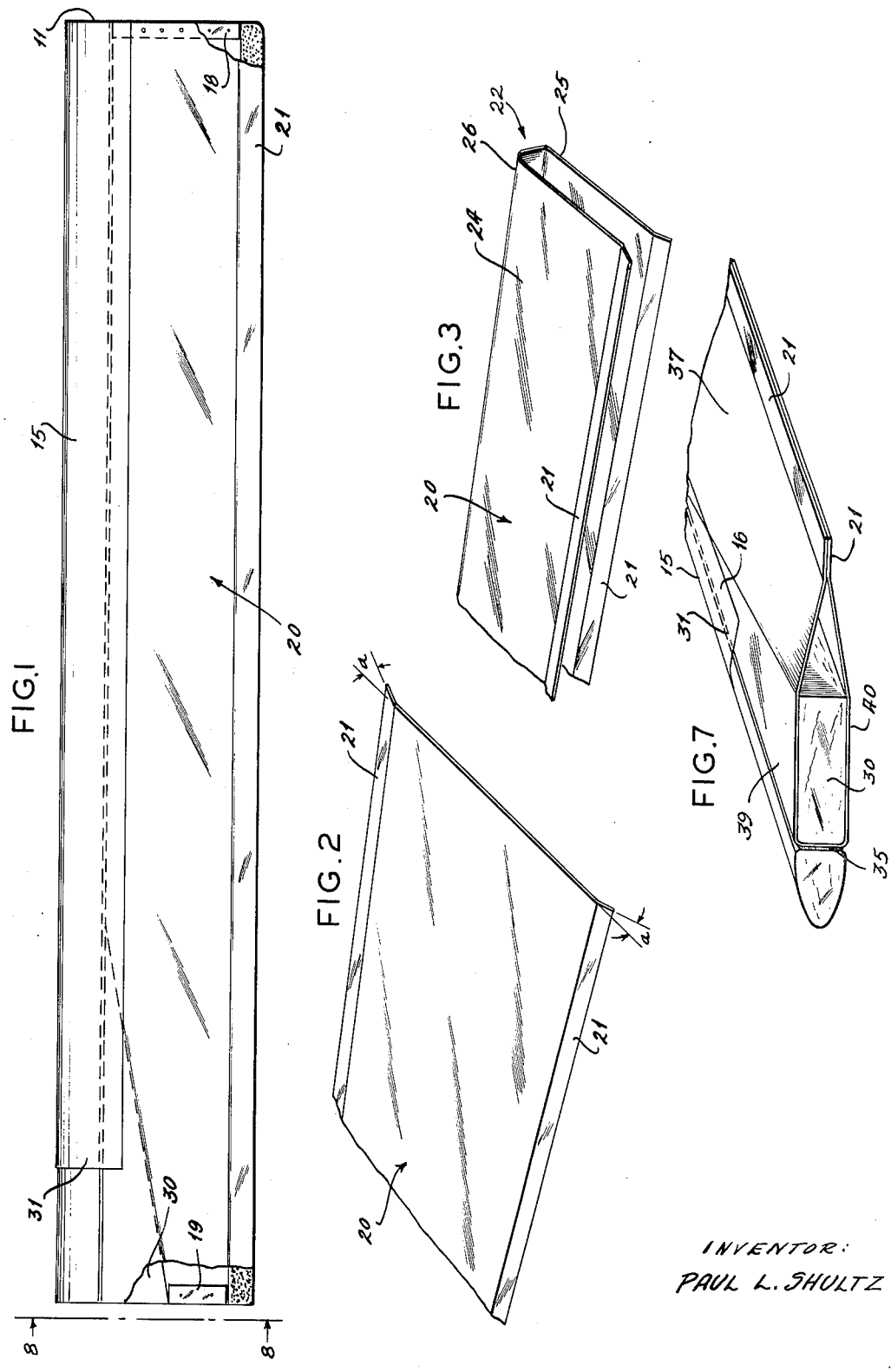

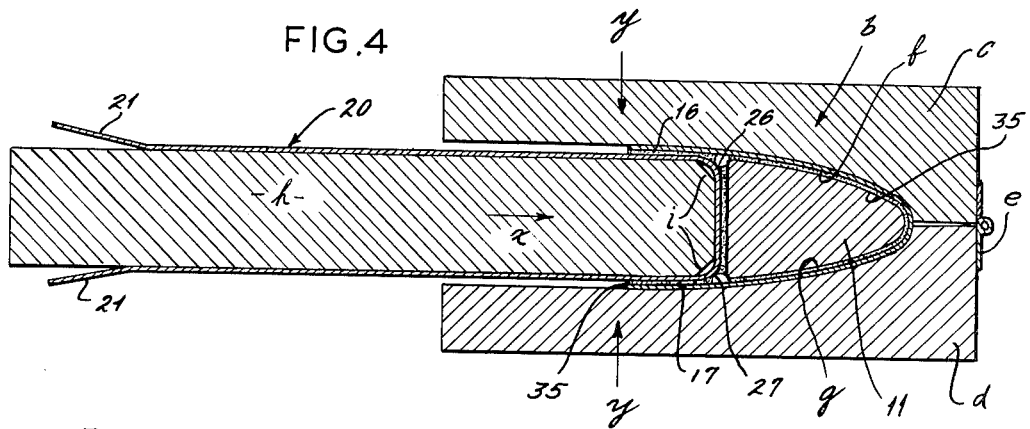
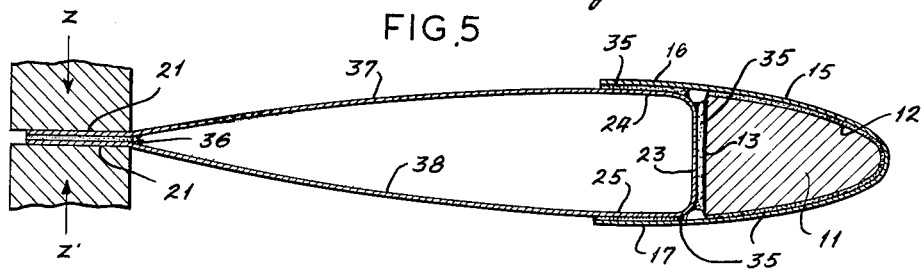
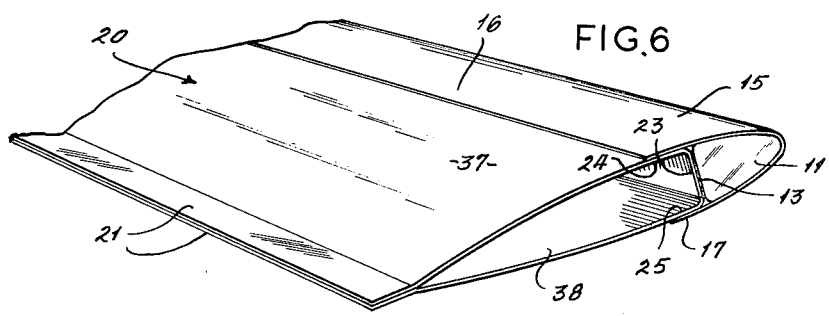
INVENTOR:
PAUL L. SHULTZ

3,200,477
HELICOPTER TAIL ROTOR STRUCTURE AND
METHOD OF CONSTRUCTION
Paul L. Shultz, Menominee, Mich., assignor to R. J.
Enstrom Corporation, Menominee, Mich., a corporation of Michigan
Filed Nov. 21, 1962, Ser. No. 239,136
1 Claim. (Cl. 29—156.8)

The present invention relates to the construction of simple airfoils having advantageous cyclic load transmission characteristics, and it has particular application to the construction of tail rotors for helicopters, and to main rotors for small helicopters.

A principal purpose of the present invention is to construct an airfoil such as a tail rotor blade out of a variety of materials, each suited for its particular function, in a simple manner and yet with structural characteristics which are advantageous under those repeated loads which have a tendency to cause fatigue failures or the peeling of adhesive bonds. A further purpose is to construct an airfoil characterized by a gradual transition in rigidity from a rigid spar to a substantially unsupported afterbody skin. An additional purpose is to make use of a stainless steel leading edge abrasion strip to lessen the likelihood of fatigue failure or peeling of adhesive. A still further purpose is to minimize the number and complexity of airfoil pre-shaping operations.

In the present invention, these purposes (as well as others apparent herein) are achieved generally by bonding a solid or thick-walled aluminum spar within a stainless steel abrasion strip whose margins project aft of the vertical aft face of the spar. A one-piece afterbody structure of aluminum sheet is pre-formed only to the extent of having bent trailing edge margins and having a channel-like bend made full length, to be adhered against the aft face of the spar. The margins are drawn and adhered together, thus bending the afterbody elastically to airfoil contour. The radii of the spanwise channel-like bend provide trussing reinforcements from the spar to the abrasion strip margins; together they afford a gradual transition of rigidity chordwise between the rigid spar and the elastically bent afterbody skins.

The new construction and method of assembly are more fully illustrated in a preferred embodiment as shown in the drawings, in which:

FIGURE 1 is a plan view of a helicopter tail rotor blade constructed in accordance with and embodying the present invention.

FIGURE 2 is a perspective view of a fragment of a blade afterbody sheet following the pre-assembly step of forming trailing edge margins.

FIGURE 3 is a view somewhat similar to FIGURE 2 showing the fragment of afterbody sheet following the forming of a central channel-like bend.

FIGURE 4 is an enlarged cross-sectional view showing the step of adhesive bonding of the afterbody sheet of FIGURE 3 to an extruded leading edge spar and a curved stainless steel leading edge abrasion strip, within a leading edge fixture and under the chordwise-forward pressure of a bonding mandrel.

FIGURE 5 is a view similar to FIGURE 4 showing the step of drawing together and adhering the trailing edge margins, thereby elastically bending the afterbody sheet to airfoil contour.

FIGURE 6 is a perspective view of the rotor blade tip end, prior to assembly of the tip closure rib.

FIGURE 7 is a view similar to FIGURE 6 of the root end of the rotor blade prior to assembly of the root closure rib, and without the addition of external root retention members, not part of the present invention.

The basic elements of a tail rotor blade constructed in accordance with the present invention are shown in the plan view FIGURE 1, as supplemented by the perspective and enlarged cross-sections as shown in the other figures. In the embodiment illustrated, a full-span aluminum spar extrusion 11, of solid D shape, includes a forward surface portion 12 curved to conform to the leading edge curvature, and an aft face 13. This is referred to as its vertical face in that it is preferably formed perpendicular to the chord line of the airfoil section. The forward surface portion 12 nests within the inner surface of a stainless steel abrasion strip 15 formed to the contour of the airfoil leading edge so that the spar 11 is snugly accommodated and adhered therein. The leading edge strip 15 has upper and lower aft margins 16, 17 which extend chordwise aft of the spar's aft face 13 a distance sufficient for adherent attachment of the afterbody skin hereinafter described.

The afterbody of the blade is formed of a single afterbody sheet generally designated 20, preferably of aluminum alloy. Its attachment to the spar aft face 13 and the upper and lower aft margins 16, 17 of the leading edge strip 15 is a significant part of the present invention, as is hereinafter described. It is bent elastically to airfoil afterbody contour as will be described later herein, and maintains this configuration without intermediate ribs. However, a tip closure rib 18, shown in FIGURE 1, is riveted in place after the forming operations have been completed, as is a root end closure 19.

Provision for root retention is made by the inclusion within the afterbody 20 of a tapered root filler block 30, shown in FIGURES 1 and 7, having parallel upper and lower surfaces. External root retention means, such as external clamping plates, (not shown) may be applied in a conventional manner, so that the blade root may be grasped through the root filler block 30. To accommodate such external clamping plates snugly, the leading edge abrasion strip 15 is shown in FIGURE 1 as being cut off at the root end, where its root edge portions 31 are bonded over the afterbody 20 in the region external to the tapered outer end of the filler block 30. Detail design provisions to accommodate conventional root retention fittings may be utilized in the usual manner, and are not a part of the present invention.

The afterbody sheet generally designated 20 is integral for the entire blade afterbody. One of the aircraft aluminum alloys is used, in a sheet no thicker than that which may be readily bent elastically to the afterbody airfoil contour, and no thinner than necessary for load carrying without excessive deformation. Selection of an appropriate thickness is a familiar matter of engineering design.

The afterbody skin 20 is preliminarily formed as shown in FIGURES 2 and 3. Both lengthwise edges are bent symmetrically to relatively small angles $a$ (each approximately half of the angle at which the upper and lower skins converge with the trailing edge), thus to form aft margins 21 along their edges.

Normally as an independent and subsequent bending operation, a channel-like bend generally designated 22 is formed spanwise along the center of the sheet. It presents a vertical web portion 23 of substantially the same height as the vertical aft face 13 of the spar 11, and extends full span, dividing the afterbody into upper and lower parallel surfaces as shown in FIGURE 3, and leaving the aft margins 21 projecting partly away from each other. Those upper and lower skin portions 24, 25 immediately aft of the web portion 23 are to be adhered to the end within the aft margins 16, 17 of the abrasion strip 15; as hereafter described. Upper and lower bend radii 26, 27 which join the web portion 23 to the upper and lower afterbody portions 24, 25 are availed of for trussing rigidity, a feature whose importance is later herein discussed.

For assembly by bonding, a hinged leading edge pressure-applying fixture generally designated $b$ is used, as shown somewhat schematically in FIGURE 4. It extends the full length of the tail rotor blade, and has an upper element $c$ and a lower element $d$ connected forward of the airfoil leading edge by a hinge $e$. Concave pressure-applying surfaces $f$ and $g$ of the upper and lower elements $c$ and $d$ respectively, when urged together by opposed vertical forces indicated by arrows $y, y'$, both supply the necessary inward bonding pressure and present a female mold surface of desired airfoil contour, around the entire leading edge and aft to approximately the region of maximum airfoil thickness.

A rigid bonding mandrel generally designated $h$ extends full span. In order that it may be pressed forward against the afterbody web portion 23, it is preferably of such width as to extend aft beyond the afterbody aft margins 21. Top and bottom edge bevels $i$ are provided along the forward surface of the bonding mandrel $h$ in the region of the bend radii 26, 27 to avoid the problem of fitting these edges with radii. Except for the bevels $i$, the afterbody 20 is conveniently rectangular in cross-section, as shown in FIGURE 4.

The bonding operation is made under such pressures as may be suitable for the bonding adhesive utilized, at elevated temperatures if appropriate. The inner surface of the abrasion strip 15, all surfaces of the spar extrusion 11 except its ends, and the surfaces of the afterbody 20 which mate with the spar 11 and abrasion strip 15 (as shown in FIGURES 4 and 5), are provided with a bonding adhesive 35. The spar's forward surface 12 is nested with its upper and lower afterbody portions 24, 25 between the abrasion strip margins 16, 17 and the channel web 23 against the aft face 13 of the spar 11. The bonding mandrel $h$ is nested forwardly within the channel-like bend 22. Its rigidity resists the opposed vertical forces $y, y'$, thus providing bonding pressure to adhere the abrasion strip margins 16, 17 to the afterbody. Pressing it forward in the manner shown by the horizontal arrow $x$ against the resistance of the leading edge fixture $b$ provides bonding pressure for the adhesive joints between the afterbody web portion 23 and the spar aft face 13, and between the spar's forward surface portion 12 and the inner surface of the forward part of the abrasion strip 15.

When the bonding operation illustrated in FIGURE 4 has been completed, the leading edge fixture $b$ is opened and removed, and mandrel $h$ is removed aft from the channel-like bend 22. The root filler block 30 is then coated with bonding material along its forward, upper and lower surfaces, and inserted in the root end of the channel-like bend 22. To form the trailing edge joint, adhesive material 36 is inserted along the inner surfaces of the trailing edge margins 21, and they are then adhesively bonded together under opposed vertical forces $z, z'$ as shown in FIGURE 5. Under these forces, the margins 21 are drawn together under the elastic resiliency of the upper and lower portions of the afterbody 20, controlled forwardly by the bending restraint offered by the aft margins 16, 17 of the abrasion strip 15. The result is to curve the portions of the afterbody elastically between the margins 16, 17 of the abrasion strip 15 and the trailing edge margins 21, thus providing the convex curvature to what are hereafter referred to as the upper afterbody curved skin portion 37 and the lower afterbody curved skin portion 38. Since a single sheet is used for the entire afterbody 20, and the abrasion strip margins 16, 17 are of equal extent, the curvatures of these upper and lower curved skin portions 37, 38 will be equal, and the resulting airfoil afterbody will be symmetrical, as is usually desirable for tail rotor blades.

At the root the filler block 30 is bonded in place by opposed vertical forces applied simultaneously with the forces $z, z'$. It distends the root contour to one which, aft of the web 23 has flattened upper and lower root end surface portions 39 and 40, behind which the skins are drawn out of airfoil curvature to a nearly flat taper, as shown in FIGURE 7.

With the completion of these bonding operations and removal of the blade structure from the fixtures utilized, the inventive aspects of the structure are essentially complete. To finish off the rotor blade, the tip closure rib 18 and root end closure 19 shown in FIGURE 1 are riveted in place. A root retention attachment, which may consist of parallel upper and lower root retention plates and a hollowed-out leading edge-grasping portion may then be applied. The present construction is well adapted for use with such familiar types of root retentions, for which reason none is shown in the drawings.

In comparison with prior procedures for manufacturing airfoils, especially rotors which are subjected to vibrations and cyclic variations of load, the present construction and method of assembly are exceptionally simple. The spar 11 may be used substantially as supplied by the extruder. The leading edge stainless steel abrasion strip 15 is readily pre-formed from thin ordinary flat sheet; and tolerances in pre-forming are taken up in the bonding operation illustrated in FIGURE 4. The afterbody's trailing edge margins 21 and channel-like bend 22 may be formed without special tooling. The simple hinged leading edge fixture $b$ and the mandrel $h$ apply bonding pressures firmly to and through the rigid spar 11.

A unique structural result is achieved, namely, the gradual transition in rigidity between the highly rigid spar 11 and the curved afterbody skins 37, 38. This transition may be thought of as occurring in successive stages. Considering FIGURE 5, where the afterbody skins 37, 38 join the abrasion strip margins 16, 17, they greatly increase the effective thickness in bending, change the vibration characteristics, and impose a damping effect. Progressively farther forward, the bend radii 26, 27 in the afterbody skin 20 serve as trusses in what is in effect a triangulated system including the abrasion strip margins 16, 17 and the spar 11. Accordingly, vibrations in the afterbody skins 37, 38 do not flex them against a rigid spar; and the dangers of fatigue failure and of bond peeling are greatly reduced.

I have achieved also a unique composite construction, in that three different types of material are used, each for its most advantageous characteristics. The solid or thick-walled aluminum spar 11, which may be inexpensively formed as an extrusion, is used for its strength, and as a precise leading edge shape, and as a balancing mass. The use of stainless steel for abrasion strips is familiar; but here the strip 15 adds a high-strength bending shell, stabilized everywhere by the other members, and also serves as part of the trussing system by which rigidity aft of the spar 11 is increased. The afterbody skin 20, being of material less dense than stainless steel, is better suited for holding the airfoil afterbody contour elastically and without intermediate ribs; in some uses even a less dense sheet material, such as magnesium, might be chosen.

Minor differences in procedure may be employed; for example, the root filler block 30 may be nested in place and adhered within the channel-like bend 22 during the first of the two bonding operations mentioned: This would involve no change of greater substance than the mere cutting off of the root end of the bonding mandrel $h$.

Since the present invention is obviously well-scaled to the construction of tail rotors of what are currently considered "average size" helicopters, I have mentioned them as illustrating a typical embodiment. However, no limitation of the invention to this scale or purpose of use is to be inferred. For example, small size helicopters are in operation whose main rotor blades are within the same general scale, and to which the details of the embodiment shown would be applicable without substantial change. Furthermore, the invention is applicable to airfoils (whether for aircraft or other purposes) of substantially larger scale, with minor modifications which will be apparent to persons skilled in the art. Accordingly, the present invention is not be construed as restricted to helicopter tail rotors, nor given any other narrow construction; but rather as fully coextensive with the claim.

I claim:

A method of constructing an airfoil having a hollow elastically conformed afterbody, comprising the steps of forming a spar of the type having a curved leading edge and terminating chordwise in a vertical aft face, independently forming a curved leading edge abrasion strip having aft margins of such chordwise length as to extend aft of the spar's aft face, independently bending the opposite lengthwise margins of a sheet of metal symmetrically to trailing-edge marginal bends, and forming a channel-like bend in said sheet midway between such margins to a depth equal to the depth of the aft face of the spar, so that such margins project partly away from each other, then applying adhesive material and nesting said parts for bonding as follows:

nesting the spar leading edge forwardly within and against the leading edge of the abrasion strip, and nesting the web of the channel-like bend against the aft face of the spar and the sheet portions adjacent to the web within the aft margins of the abrasion strip, independently inserting a bonding mandrel supportively within the channel-like bend and applying chordwise-forward pressure, then bonding the nested parts simultaneously under external pressure, then removing such bonding mandrel, then elastically drawing the bent margins together against the elastic resistance of the channel-like bent sheet and the bending restraint offered by the bonded together nested parts and adhering said bent margins together to form a trailing edge, thereby elastically curving the sheet portions unsupported between the margins of the abrasion strip and the trailing edge to airfoil afterbody contour.

References Cited by the Examiner

UNITED STATES PATENTS

| | | | |
|---|---|---|---|
| 1,996,850 | 4/35 | Bendix | 170—159 |
| 2,183,158 | 12/39 | Bennett | 170—159 |
| 2,511,858 | 6/50 | Lampton | 170—159 |
| 2,596,818 | 5/52 | Meyers | 170—159 |
| 2,674,327 | 4/54 | Pullin et al. | 170—159 |
| 2,884,078 | 4/59 | Stamm | 170—159 |
| 2,941,603 | 6/60 | Jovanovich | 170—159 |
| 3,045,967 | 7/62 | Clarke | 170—159 |
| 3,123,144 | 3/64 | Stuten et al. | 170—159 |

FOREIGN PATENTS 662,110   11/51   Great Britain.

JULIUS E. WEST, *Primary Examiner.*

EMILE PAUL, *Examiner.*